US006480476B1

(12) United States Patent
Willars (10) Patent No.: US 6,480,476 B1
(45) Date of Patent: Nov. 12, 2002

(54) VARIABLE SLEEP MODE FOR MOBILE STATIONS IN A MOBILE COMMUNICATIONS

(75) Inventor: Per Willars, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/177,596

(22) Filed: Oct. 23, 1998

Related U.S. Application Data (60) Provisional application No. 60/104,333, filed on Oct. 15, 1998.

(51) Int. Cl.[7] .......................... G08C 17/00; H04B 1/16; H04L 7/00
(52) U.S. Cl. ...................... 370/311; 370/350; 455/343; 455/522; 455/553; 340/7.34; 340/825.2
(58) Field of Search .......................... 370/311–313, 328, 370/329, 350; 455/422, 343, 522, 507, 517, 500, 526, 574, 553; 340/7.34, 7.39, 7.54, 7.33, 825.2

(56) References Cited

U.S. PATENT DOCUMENTS

| 4,804,954 | A | * | 2/1989 | Macnak et al. ............. 340/7.34 |
| 5,301,225 | A | | 4/1994 | Suzuki et al. |
| 5,428,820 | A | * | 6/1995 | Okada et al. ............... 340/7.33 |
| 5,574,996 | A | | 11/1996 | Raith |
| 5,627,882 | A | | 5/1997 | Chien et al. |
| 5,745,695 | A | | 4/1998 | Gilchrist et al. |
| 5,758,278 | A | * | 5/1998 | Lansdowne ............... 340/825.2 |
| 5,806,007 | A | * | 9/1998 | Raith et al. ................. 340/7.34 |
| 6,058,289 | A | * | 5/2000 | Gardner et al. ............ 340/7.32 |
| 6,157,845 | A | * | 12/2000 | Henry et al. ................ 455/553 |

FOREIGN PATENT DOCUMENTS

| EP | 0 763 957 A2 | 3/1997 |
| EP | 0 851 703 A | 7/1998 |
| WO | 97/26764 A | 7/1997 |
| WO | 97/37504 | 10/1997 |
| WO | 98/12887 A | 3/1998 |
| WO | 98/35473 | 8/1998 |

OTHER PUBLICATIONS

ISS '97, (International Switching Symposium), Global Network Evolution: Convergence or Collision? Toronto, Sep. 21–26, 1997, vol. 2, Sep. 21, 1997, pp. 339–345, XP000704485, Andreas Schieder et al., "GRAN—A New Concept for Wireless Access in UMTS".

* cited by examiner

Primary Examiner—Alpus H. Hsu
Assistant Examiner—Afsar M. Qureshi
(74) Attorney, Agent, or Firm—Nixon & Vanderhye (57) ABSTRACT

A sleep cycle of a mobile station may be optimally varied depending upon one or more conditions relating to the mobile station's operation. Based on one or more of those conditions, a variable wake up parameter is determined and used to establish times when the mobile station automatically leaves a lower power mode and enters a higher power mode to listen for a page. The mobile station's variable wake up parameter is provided to a radio access network and to one or more core networks to permit coordination of communications and services with the mobile station.

70 Claims, 7 Drawing Sheets

VARIABLE SLEEP MODE FOR MOBILE STATIONS IN A MOBILE COMMUNICATIONS

This application claims benefit of provisional application Ser. No. 60/104,333 Oct. 15, 1998.

FIELD OF THE INVENTION

The present invention relates to battery-operated mobile radio stations, and more particularly, to balancing the desire to conserve battery power with other factors that effect mobile station performance.

BACKGROUND AND SUMMARY OF THE INVENTION

Mobile communications have developed from first generation, analog-based mobile radio systems to second generation digital systems, such as the European Global System for Mobile communications (GSM). Current developments for a third generation of mobile radio communications are referred to as the Universal Mobile Telephone communications System (UMTS). In simple terms, the UMTS is "communication to everyone, everywhere," where communication includes the provision of information using different types of media, i.e., multimedia communications. The goal of UMTS services is to combine both fixed and mobile services to form a seamless, end-to-end service for the user.

Because of the widespread success of the existing GSM platform, i.e., a global "GSM-footprint," as well as the inherent upgradability and modularity of the GSM platform, there is a strong impetus to base the UMTS on an "evolved" GSM platform. Accordingly, the present invention is described in the context of a UMTS based on an evolved GSM platform, and therefore, uses GSM terminology. Of course, the principles of the present invention are not limited to a UMTS, a GSM platform/terminology, or to any specific mobile communications network and may be implemented using other appropriate network platforms and configurations.

Current mobile/cellular telecommunications networks are typically designed to connect and function with Public Switched Telephone Networks (PSTNs) and Integrated Services Digital Networks (ISDNs). Both of these networks are circuit-switched networks—rather than packet-switched—and handle relatively narrow bandwidth traffic. However, packet-switched networks, such as the Internet, are very much in demand and handle much wider bandwidth traffic than circuit-switched networks. While wireline communication terminals, e.g., personal computers, are capable of utilizing the wider packet-switched network bandwidth, wireless mobile radio terminals are at a considerable disadvantage because of the limited bandwidth of the radio/air interface that separates the mobile terminals from packet-switched networks.

There is also a need for a radio access system that provides wireless access at very high data rates and supports enhanced bearer services not realistically attainable with the first and second generation mobile communication systems. This need may be best satisfied by a Wideband-Code Division Multiple Access (W-CDMA) radio access network.

To assist in the following description, a UMTS 10 is now briefly described in conjunction with FIG. 1. A representative-connection-oriented, external core network, shown as the cloud 12, may be for example the Public Switched Telephone Network (PSTN) and/or the Integrated Services Digital Network (ISDN). A representative-connectionless-oriented, external core network, shown as cloud 14, may be for example the Internet. Both networks 12 and 14 are coupled to corresponding core network (CN) service nodes 16. The PSTN/ISDN circuit-switched network 12 is connected to a connection-oriented service node shown as a circuit-switched services node 18 which, in a GSM platform, includes a mobile switching center (MSC) 23 and a corresponding visiting location register (VLR) 24. Also in the existing GSM platform, the circuit-switched services node 18 is connected to a base station system (BSS) 26 which in turn is connected to a radio base station (BS) 28 having a corresponding geographical cell area 34.

The connectionless-oriented service node is a packet-switched services node 20 tailored to provide packet-switched type services. In the GSM platform, such a node corresponds to one or more of the General Packet Radio Service (GPRS) nodes, e.g., SGSN, GGSN, etc. Each of the core networks 18 and 20 also connects to a home location register (HLR) 22 which stores mobile station identification, subscription, and mobility/location information. Core network service nodes 18 and 20 are also connected to an UMTS radio access network (URAN) 30 which includes one or more radio network controllers (RNC) 32 coupled to one or more base stations 28, each base station having a corresponding geographical cell area 34. The radio access network 30 provides services to/from mobile stations 36 over the radio interface to the core network service nodes 18 and 20 without the core networks having to request specific radio resources necessary to provide those services. The UMTS radio access network (URAN) 30 "maps" radio access bearers onto physical radio channels—a task by and large controlled by the radio network controllers 32. In a W-CDMA system, individual radio channels are allocated using spreading codes. As described above, W-CDMA provides the wide bandwidth for multimedia services and other high rate demands. In addition, it also provides robust features like diversity handoff and RAKE receivers to ensure high communications quality.

When a mobile station is in an idle state, e.g., not involved in a connection with the URAN 30, the core networks need to be able to locate and communicate with the mobile station. Mobile stations also need to be able to initiate communications with the core networks. Typically, common channels are employed: one on the downlink direction from the base station to the mobile station (a paging channel), and another in the uplink direction from the mobile station to the base station (a random access channel). Periodically, the idle mobile station registers or otherwise makes its presence known to the base station of a particular cell in which it is currently physically located. If the core network service nodes do not know the specific cell where the mobile station is currently located, the core networks service nodes typically know the general location of the mobile station, i.e., a group of cells typically called a location area. Thus, when a call is to be directed from a core network to a mobile station, a paging procedure is performed where a paging message is sent to the mobile station over the downlink paging channel requesting that the mobile station initiate establishment of a connection with the radio access network 30 via the cell where it is currently located.

In order for the mobile station to receive paging messages, it must be "awake," i.e., powered up, and listening at the appropriate time to the particular control channel over which the specific paging message was transmitted. If the mobile radio is continually powered and always monitoring that paging channel, there is a high probability that it will detect and accurately receive the page. But mobile stations are normally battery operated, and batteries have a limited life before they must be recharged. Continued monitoring of the paging channel therefore dramatically shortens battery life.

Accordingly, it is desirable to eliminate or otherwise minimize battery consumption where practical. The general idea is to place the mobile station into a low power consumption or "sleep" mode to save battery power when the mobile station need not perform any necessary function. In order to make sure that it receives important messages, the mobile station is periodically awakened from its sleep mode to a higher power mode so that it can receive messages such as pages or send periodic updates of its location via a common channel. The basic problem of optimizing the sleep mode is a design tradeoff between a longer sleep mode which conserves the mobile station battery power and a shorter sleep mode which provides greater performance like faster call setup times or shorter data transfer delay in the downlink direction towards the mobile station.

One way to approach this optimization problem is to specify a fixed sleep mode period where all mobile stations experience the same battery consumption delay tradeoff. While this approach is attractive because of its relatively easy implementation and administration, it ignores among other things user preferences, priorities, and communications service requirements. It would be desirable to permit users to vary the sleep mode period to accommodate such preferences, priorities, and/or service requirements. Moreover, in situations where there is typically low mobile station activity, and where the mobile station location is known only generally rather than at an individual cell level, the fixed delay would need to be relatively long requiring a relatively long fixed sleep cycle. However, this longer period may be inappropriate for other services requiring shorter delays. As a result, the fixed sleep period would need to be set at a short sleep cycle to accommodate the highest activity mode and/or service tolerating the least delay. Thus, even though the mobile station may have a high activity level or use a short delay type of service for only brief intervals, the mobile station will wake up with high frequency all of the time. This high frequency wake up unnecessarily consumes limited battery power.

It is an object of the present invention to provide a power conserving sleep mode for a mobile station that may be varied to accommodate particular factors or circumstances.

It is an object of the present invention to provide a variable sleep mode where the mobile station initiates the change of the variable sleep mode.

It is a further object of the present invention to provide a variable sleep mode that takes into account different activity levels of the mobile station.

It is a further object of the present invention to provide a variable sleep mode that takes into account mobile station operator priorities and preferences.

It is a further object of the present invention to provide a variable sleep mode that takes into account different mobile station services and time constraints associated therewith.

It is yet another object of the present invention to coordinate variable sleep modes in mobile station communications with plural core networks.

The present invention solves these problems and meets these and other objects by providing a method of operating a mobile station where a sleep cycle of the mobile station may be optimally varied depending one or more conditions relating to the mobile station's operation. Based on one or more of those conditions, a variable wake up parameter value is determined and used to establish times when the mobile station automatically leaves a lower power mode and enters a higher power mode to, for example, listen for a page. The mobile station's variable wake up parameter is provided to the radio access network and to the core networks to permit coordination of communications and services with the mobile station.

If there is a change in one or more of the conditions that relate to the mobile station's operation, the value of the variable wake up parameter may be varied in response to that change. For example, the mobile station may operate at plural activity levels and a detected change may include operating at a different one of the plural activity levels. The different activity levels have corresponding, different lengths of time required to setup a call or transfer downlink data. The detected change may also include the mobile initiating a change in an operating condition during the time the mobile is within one of those activity levels.

If the condition is the current activity level of the mobile station, the variable wake up parameter is varied to increase the frequency at which the mobile station wakes up for a higher activity level. For a lower current activity level, the variable wake up parameter may be varied to decrease the frequency at which the mobile station wakes up. If the condition is a service that is currently requested or subscribed by the mobile station, the variable wake up parameter value is varied to increase the frequency at which the mobile station wakes up if the current service requires a low delay. If the service permits a higher delay, the variable wake up parameter value may be varied to decrease the frequency at which the mobile station wakes up. If the service includes a maximum delay parameter, the value of the variable wake up parameter is varied to decrease the frequency in which the mobile station wakes up without exceeding that maximum delay parameter.

The present invention also permits a user to prioritize either battery conservation or lower delay, and as a result of that user priority, the variable wake up parameter is appropriately varied. Moreover, the variable wake up parameter value may also be varied depending on the type of power source currently powering the mobile station. For example, a power source having a shorter life suggests a longer sleep cycle; a power source having a longer life suggests the option of a shorter sleep cycle.

In a preferred example embodiment of the present invention, the wake up parameter is calculated in accordance with the following: $S=2^n$, where S is the duration of the variable sleep cycle, measured for example as an integer number of communication channel frames, during which time the mobile station is in the lower power mode, and n is a variable integer. Assuming that the base station and mobile station communicate using a communications channel that is divided into a repeating sequence of M frames. The number of frames M in the sequence is preferably an integer power of 2. The specific wake up frame number W when the mobile station enters a higher power mode may be determined in accordance with the following: $W=(kS)$ modulo M, where k is an integer.

Figure 1:
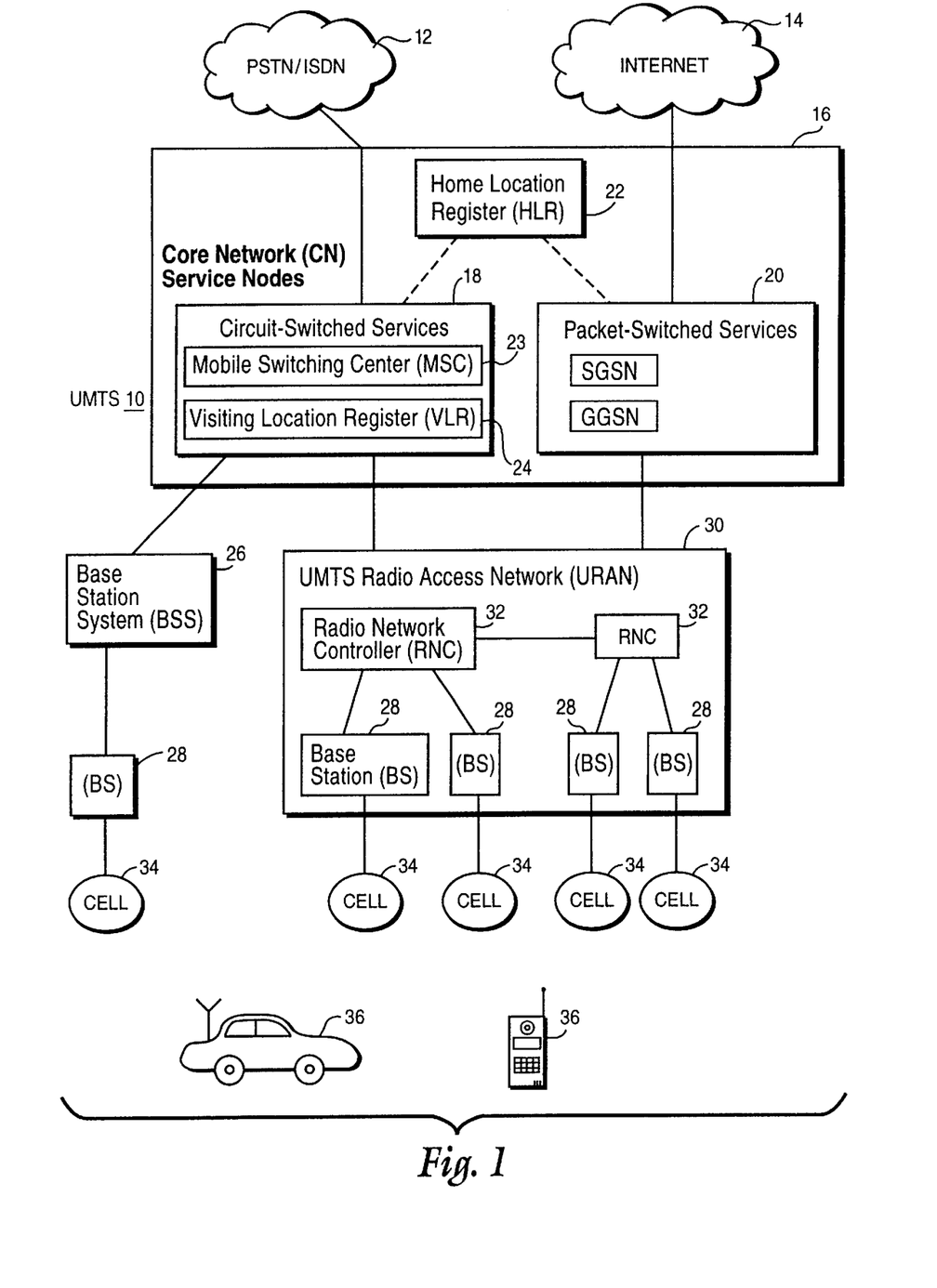
FIG. 1 is a diagram of an example universal mobile telephone system (UMTS) in which the present invention may be advantageously employed.

The variable sleep mode approach of the present invention also provides considerable flexibility and optimization in communications networks such as the UMTS shown in FIG. 1. For each of the core networks, the mobile station may have a corresponding variable sleep parameter. As a result, the time interval when the mobile station awakens from a lower power sleep mode to a higher power sleep mode may vary based on the current operating conditions and communications between the mobile s station and the core networks. The present invention also provides a method of coordinating and synchronizing wake up time periods for plural core networks having different mobile station variable sleep mode parameters.

While the present invention does not eliminate the fact that there is a tradeoff between battery saving and service quality/delay, the variable sleep mode capabilities of the present invention permit optimization of that tradeoff in accordance with the individual objectives and/or conditions of a particular user/mobile station.

BRIEF DESCRIPTION OF THE DRAWINGS

These and other objects, features, and advantages of the present invention will now be described in conjunction with the drawings in which.

DETAILED DESCRIPTION OF THE DRAWINGS

In the following description, for purposes of explanation and not limitation, specific details are set forth, such as particular embodiments, data flows, signaling implementations, interfaces, techniques, etc. in order to provide a thorough understanding of the present invention. However, it will be apparent to one skilled in the art that the present invention may be practiced in other embodiments that depart from these specific details. For example, the present invention is described in the example, non-limiting context of the Universal Mobile Telecommunications System (UMTS) 10 shown in FIG. 1 and described above. Thus, while the present invention is described in the context of an example cellular telephone network using GSM and UMTS terminology, those skilled in the art will appreciate that the present invention can be implemented in any cellular telephone system. In other instances, detailed descriptions of well-known methods, interfaces, devices, and signaling techniques are omitted so as not to obscure the description of the present invention with unnecessary detail.

Figure 2:
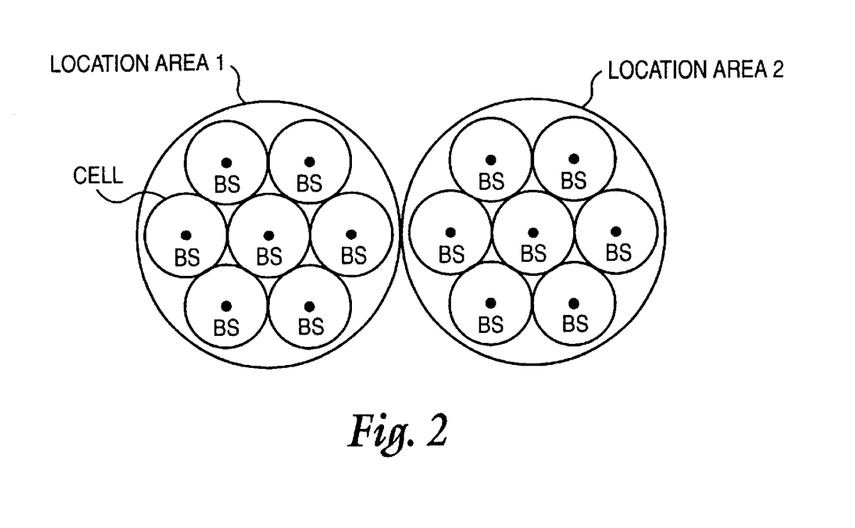
FIG. 2 is a diagram illustrating location areas that may be used in mobile station location management and paging procedures.

There is an interrelationship between the mobile station variable sleep mode of the present invention and mobile station location management which includes both location updating and paging procedures. Such location procedures allow networks to keep track of the mobile's location more or less accurately in order to be able to find the mobile station in the case of an incoming call. Location registration is also used to bring the mobile's service profile near its location and to allow the network to rapidly provide services, e.g., the visiting location registration (VLR) functions in GSM. The paging process includes sending paging messages in all cells where the mobile station could be located. Therefore, if the location cost is high from the sense that the user location knowledge is accurate, the paging costs will be low (paging messages will only transmit over a small area), and call setup will ultimately be much faster. On the other hand, if the location cost is low and user location information is general or "fuzzy," the paging costs will be high because paging messages will have to be transmitted over a wider area. Presently, the location method most widely implemented in first and second generation cellular systems makes use of location areas (LAs) as shown in FIG. 2. Each location area includes plural base station cells. Location areas allow tracking of mobile stations, where a mobile's location is "known" if the system knows the location area in which the mobile is located.

Figure 3:
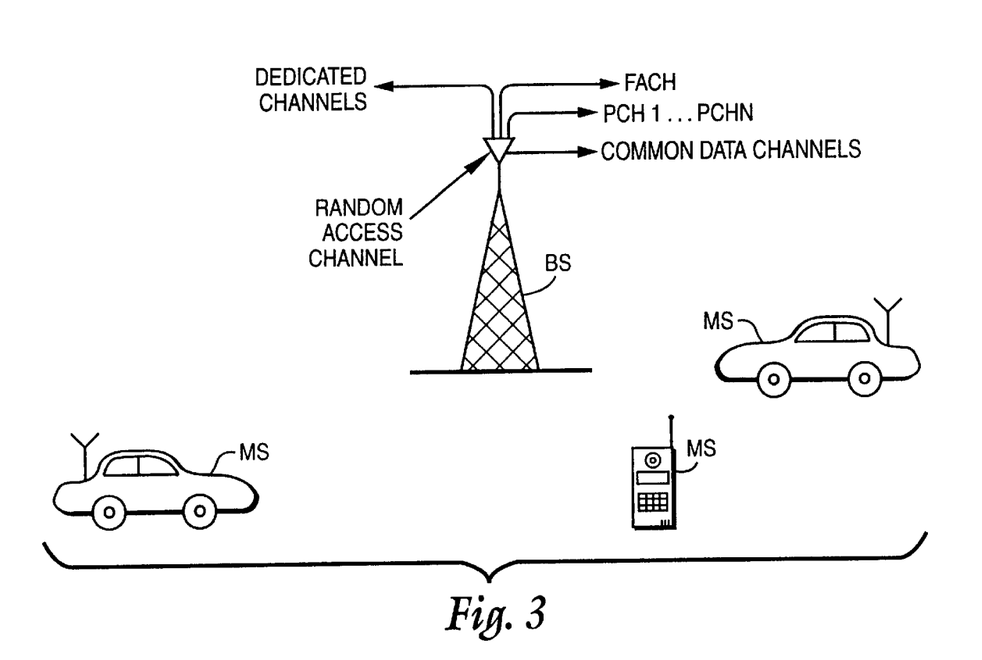
FIG. 3 is a diagram illustrating various example types of channels used for communications between a base station and a mobile station.

Because of the different services offered in a UMTS and the considerable demands on limited channel resources, the UMTS 10 uses different types of channel resources. Some examples are shown in FIG. 3. Certain services such as speech services require a dedicated channel resource, e.g., a dedicated channel. Other services that tolerate variable delay and throughput can utilize a more efficient common channel which is shared by multiple users. The base station also transmits various overhead and identification information over a broadcast control channel (BCCH), and typically, one or more paging channels (PCH1 ... PCH N) are used to send paging messages to mobile stations in the base station's cell area. Still further, a common random access channel (RACH) is employed by mobile stations in the base station's cell to request services and transfer short bursts of data. A Forward Access Channel (FACH) is a common channel used by the base station to transmit data to multiple mobile stations. The URAN 30 schedules the FACH transmission times for different mobile stations.

Better resource utilization may be obtained by allocating resources depending on the amount of data being transmitted, e.g., depending upon the current activity level of the mobile station. Each different activity level has a corresponding location management situation. The following is an example breakdown of possible activity levels:

Activity level A1 corresponds to a dedicated channel which is typically used for very high activity levels or delay intolerant services like speech. The URAN 30 manages the setup of a dedicated data channel. The mobile's location is obviously known in this situation.

Activity level A2 corresponds to a common channel shared by multiple mobile stations for what are typically medium to medium-high activity levels. Examples of common data channels are the random access channel and the forward access channel shown in FIG. 3. The mobile station's position is known at a specific cell by the URAN 30, and the URAN 30 handles that connection.

Activity level A3 corresponds to the activity on a paging channel which is employed when a mobile station's location is known by the URAN 30 on a URAN Registration Area (URA) basis, i.e., at a group of cells rather than at an individual cell level. Typically, paging channels have low activity.

Activity level A4 corresponds to activity on a paging channel managed by one of the core network service nodes because the URAN 30 has no information about the location of a mobile station in idle state, i.e., there is no current "connection" between the mobile station and the URAN 30. Activity level A4 corresponds to very low activity where the mobile station location is known only at a large group of cells corresponding for example to a URA known only at the core networks.

Thus, if there is a connection—either uplink or downlink—between the mobile station and the URAN, the location of the mobile station is known and handled by the URAN. On the other hand, when there is no connection between the URAN and the mobile station, the mobile station's location is only generally known in a core network.

It is quite inefficient, inflexible, and inconvenient to have a single, fixed sleep mode that optimally accommodates various mobile station activity levels such as the activity levels A1–A4. For example, there is no need to have a short delay period corresponding to a short wake up cycle which might be suitable for medium-high activity at level A2 when the mobile station is in an idle state at activity level A4. In such a situation, frequent high power wake ups to listen to the paging channel simply waste the mobile station's battery.

Figure 4:
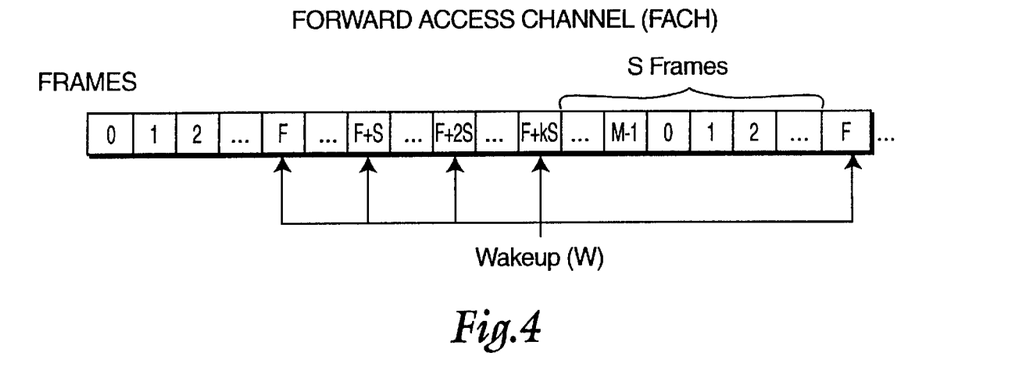
FIG. 4 is a diagram illustrating a format of a framed paging or broadcast channel showing a mobile station's sleep cycle (S) and corresponding wake up frames (W)

The present invention rejects the rigidity of a fixed sleep cycle approach and instead provides a variable sleep mode cycle which can be tailored to best serve the current needs and circumstances of the mobile station/user. There are many different ways in which a variable sleep cycle may be determined; therefore, the following method is merely an example. The variable sleep mode cycle S may be defined as follows: $S=2^n$, where n is a sleep mode parameter whose value can be changed as necessary to vary the sleep mode cycle S. Typically, paging channels are divided into a series of frames, each frame having a frame number. The frame numbering scheme is "modulo" meaning that after reaching the last frame number, the frame numbering restarts from the beginning. FIG. 4 illustrates an example paging and broadcast channel having numbered frames 0, 1, 2, . . . , M−1, where M is the number of frames in the repeating cycle. In this example embodiment, the variable sleep mode parameter "n" in an integer between 0 and 2 log M. M should be selected to accommodate the largest possible sleep mode cycle and preferably as a power of 2.

During the sleep mode cycle S, the mobile station enters a low power mode of operation which conserves battery power. At the end of a sleep cycle, the mobile station wakes up and enters into a higher power mode of operation to perform an operation such as listening for a page on the paging channel before going back to sleep.

The mobile station may need to know what radio frequency to listen to if more than one frequency carries a paging channel, what paging channel among plural paging channels if there are several in the cell to listen to, what frame to listen to, and if the frames are divided into slots, what subslot the frame in which to listen for the page. One way of selecting the frequency (if needed), the paging channel identification (if needed), the frame number (F), and the frame subslot (if needed) is to employ a selecting algorithm in both the mobile station and in the URAN based on a mobile identifier such as the mobile station's International Mobile Subscriber Identifier (IMSI). In any event, once an absolute frame number F is determined, the frame numbers in which the mobile station should wake up corresponding to times when it might possibly receive a page is determined in accordance with the following: $W=(F+kS)$ modulo M, where k is an integer. FIG. 4 provides an illustration of this relationship with wake up frames W at F, F+S, F+2S, . . . , F+kS. By changing the variable n, the mobile's sleep mode cycle changes, and the frame number W in which the mobile station wakes up, e.g., to listen to a particular paging channel, also varies.

Figure 5:
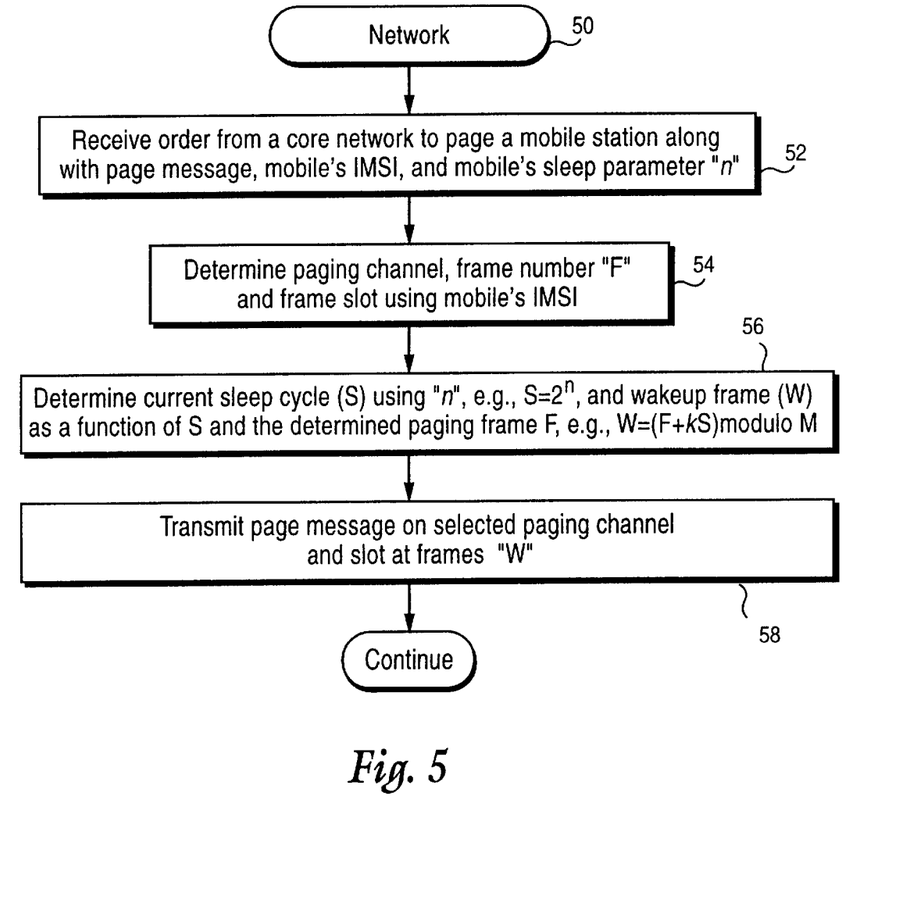
FIG. 5 is a flowchart diagram illustrating example procedures performed by a base station to send a page message to a mobile station.

Knowing the mobile's IMSI and the current value of "n," the mobile station, the URAN 30, and the core network service nodes 18 and 20 can readily determine when and how a page for the mobile station will be transmitted from one (or more). base stations in the URAN 30. A Network routine (block 50) provides example procedures performed by all base stations in the location area where the URAN 30 or the core network wants to page the mobile station. The URAN receives an order from a core network service node to page the mobile station and also receives the substantive paging message, the mobile station's IMSI, and the mobile station's variable sleep parameter value n (block 52). The specific paging channel, frame number F, and frame slot (optionally) are determined using the mobile station's IMSI (block 54). Using the mobile station's variable sleep parameter n, the URAN then determines the mobile station's variable sleep cycle S, e.g., $S=2^n$, and the wake up frames W using S and the determined paging frame F, e.g., $W=(F+kS)$ modulo M (block 56). One or more base station(s) then transmit(s) the page message on the selected paging channel and slot at every frame number W (block 58).

The base station(s) may retransmit the page message a given number of times to decrease the probability that the mobile misses the page message due to changing radio or cell conditions. A page response from the paged mobile detected either by the paging core network or possibly by the RNC. If the core network does not receive a page response, it may repeat the paging procedure one or more times. Thereafter, if there is still no page response, the mobile is considered "detached" (not reachable).

Typically, transitions between the various activity levels such as A1–A4 described above are performed to optimize use of radio resources and accordingly are initiated from and controlled by the URAN 30. On the other hand, the setting and change of the variable sleep mode period for the mobile station is determined by the mobile station/user and is based on factors like battery resource optimization, desired performance, etc. There are a variety of ways to relate variable sleep mode cycles to different activity levels. For example, the mobile station may employ a default sleep mode cycle for all activity levels, but if the mobile station has the ability to effect a change in the sleep mode cycle. Alternatively, different default sleep mode cycles may be stored in both the mobile station and the URAN 30 for each activity level. In that case, when the mobile station changes activity levels, a sleep mode cycle automatically changes. Further, the mobile station may vary the sleep mode cycle within each activity level. Thus, even though the sleep mode cycle may be defined for each activity level, e.g., a default value, the mobile station can change that sleep mode cycle in that activity level.

Figure 6:
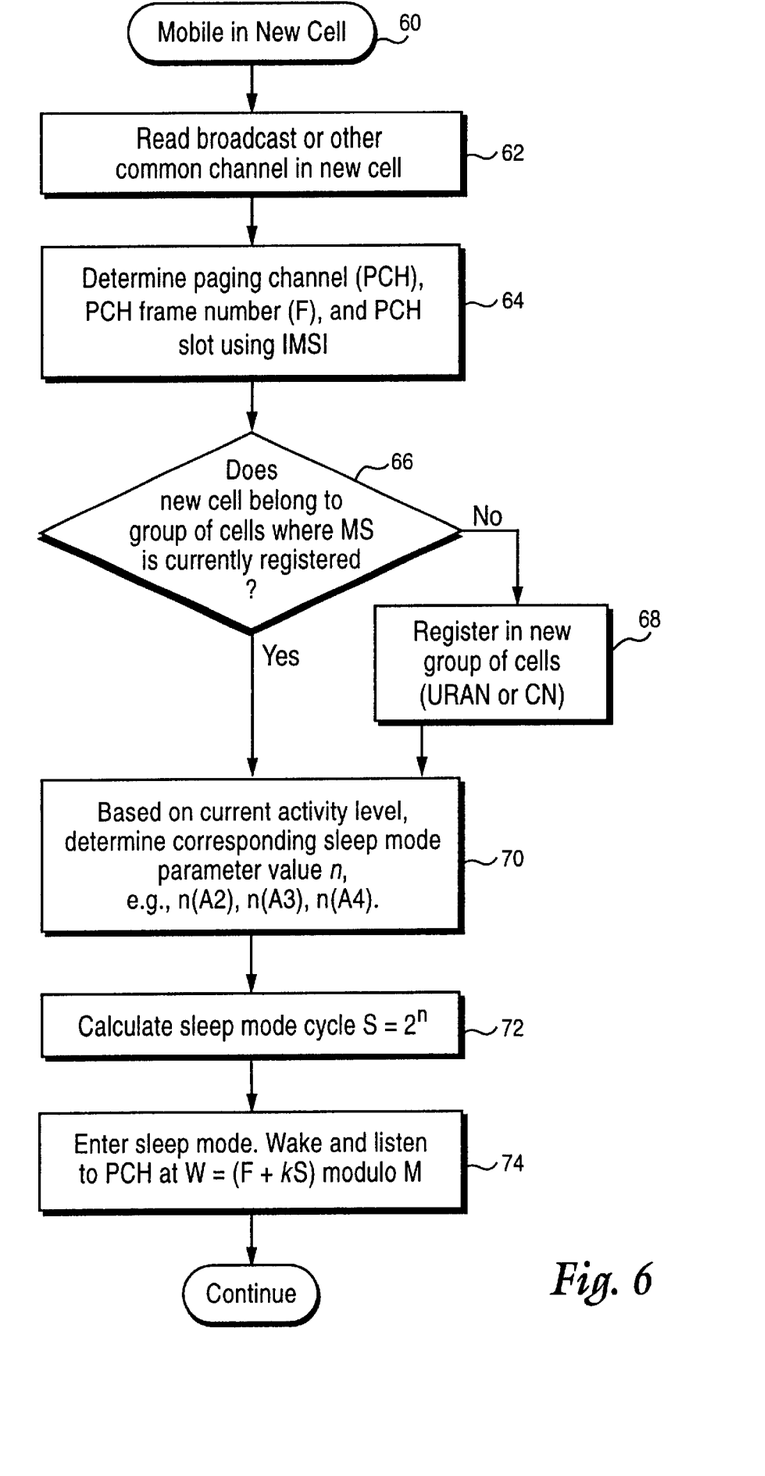
FIG. 6 is a flowchart diagram illustrating example procedures performed by a mobile station as it enters into a new cell.

Consider the situation in which a mobile enters a new cell (block 60) and the example procedures followed outlined in the flowchart in FIG. 6. The mobile station first reads the broadcast (or other common) channel transmitted by the base station in the new cell (block 62). From information provided in the broadcast (or other common) channel, the mobile station determines the appropriate paging channel (PCH), paging channel frame number (F), and (optionally) paging channel slot using its IMSI (block 64). A decision is made in block 66 whether the new cell belongs to a group of cells/location area where the mobile is already registered. If not, the mobile station registers in a new group of cells with the URAN 30 and/or one of the core network(s) (block 68). Based on its current activity level (e.g., activity levels A1–A4), the mobile station may determine its corresponding sleep mode parameter value n for that activity level (block 70).

Of course, if a dedicated channel is already established between the mobile and the URAN 30, (e.g., activity level A1), the mobile station will not enter a sleep mode. As mentioned above, at activity level A2 where a mobile station-URAN 30 connection exists, the mobile station is registered in a single cell and is communicating via a common channel. Therefore, the URAN 30 does not need to page the mobile station since its current cell is known. Data for this mobile station is only transmitted on the common channel during the wake up frames (W) calculated for the mobile station in accordance with the variable sleep mode cycle formula $S=2^n$ (block 72), and the wake frame formula $W=(F+kS)$ modulo M (block 74) using an associated activity sleep mode parameter n(A2).

In activity level A3 where a mobile station URAN connection exists and the mobile station is registered in a location area, an associated activity sleep mode parameter n(A3) is employed to determine S and W. Like n(A2), n(A3) may also be changed on the initiative of the mobile station at any time, e.g., the sleep mode parameter may be increased if the user prioritizes battery savings. Similar procedures are also used for activity state A4.

As in the above example, the sleep mode parameter n may differ depending upon the mobile station's current activity level. In addition, there may be other procedures employed to determine the current activity of the mobile station independent of and/or in conjunction with a more formalized activity level structure, e.g., activity levels A1–A4. In fact, a variety of other factors can also be employed to determine the appropriate sleep mode parameter that optimizes the circumstances of the current situation.

The sleep mode parameter may be varied based on a service currently requested or subscribed by the mobile station. For services requiring a lower delay, the variable sleep mode parameter value may need to be decreased. Conversely, for a current service that tolerates a higher delay, the variable wake up cycle parameter may be increased to decrease the frequency at which the mobile station wakes up thereby conserving battery power. Of course, if the service has a maximum delay parameter, the value of the variable wake up cycle parameter should not be increased so much that the resulting sleep cycle exceeds that maximum delay parameter.

In addition, there may be specific inputs provided directly by a user of the mobile station prioritizing battery conservation or shorter delay. If the user prioritizes battery conservation, the variable wake up cycle parameter may be increased to decrease the frequency at which the mobile station wakes up. Conversely, if the user desires shorter delay and more rapid response, the variable sleep cycle parameter may be decreased to increase the frequency with which the mobile station wakes up ultimately resulting in shorter call setup times.

Yet another variable might be the type of power source currently powering the mobile station. If the mobile station is on battery power, then the variable wake up cycle parameter might be increased to save the battery. On the other hand, if the mobile station is temporarily powered from an electrical outlet, then the user can cause the variable wake up cycle parameter can be decreased since power conservation is less of an issue. Different types of batteries, one having a short life and one having a longer life, provide similar possibilities for different values of wake up cycle parameters.

Figure 7:
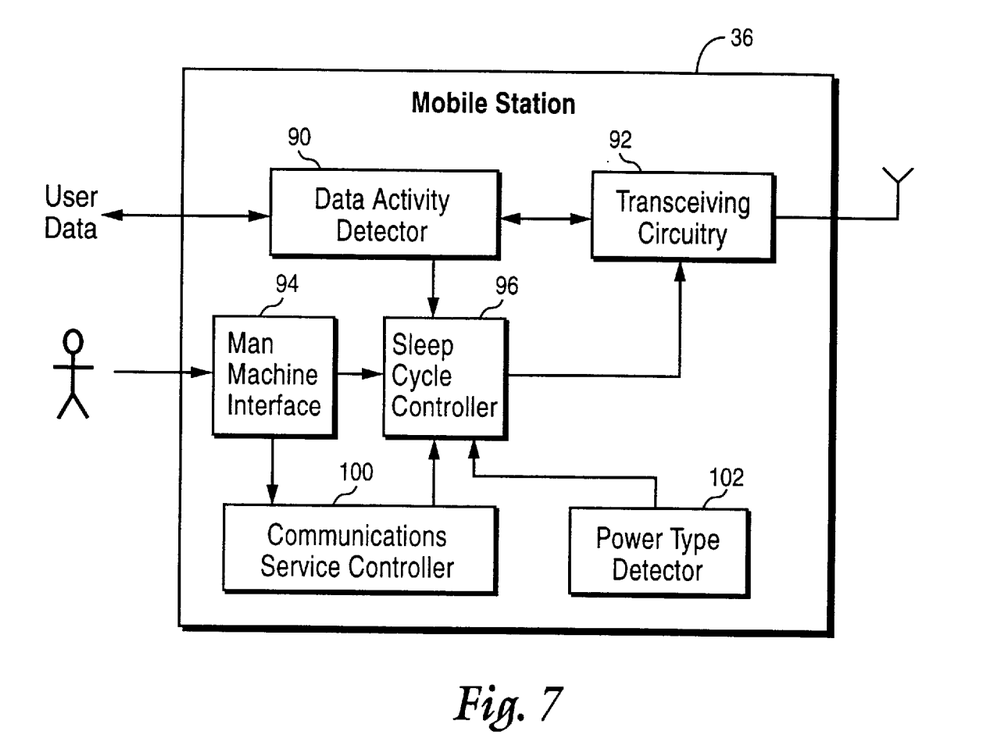
FIG. 7 is a function block diagram of a mobile station in accordance with one example embodiment of the present invention.

Reference is made to FIG. 7 which shows a mobile station 36 in function block format. The mobile station includes transceiving circuitry 92 and other circuitry (not shown) for performing typical functions of a mobile station. In accordance with an example implementation of the present invention, the mobile station may also include a data activity detector 90 which detects the current level of activity of the mobile station. For example, the data activity detector 90 may detect the average packet arrival time measured over a given period of time. The level of data activity is provided to a sleep cycle controller 96 which determines the value of the variable sleep mode parameter n. For example, the sleep cycle controller 96 may select n based upon comparison of the currently detected activity to one or more thresholds. For higher levels of activity, the sleep mode parameter n would have a lower value and vice versa. Data activity may also be detected based on the time since the last data transfer as compared to volume. If that time exceeds a particular threshold, then the sleep mode parameter can be increased.

The mobile station 36 also includes a man machine interface 94 which permits a mobile station user to input desired priorities such as battery conservation or short setup delay. These inputs are provided to the sleep cycle controller 96 and to communications service controller. The sleep cycle controller 96 then selects a higher variable sleep mode parameter value if battery conservation is prioritized or a lower value if short setup delay is prioritized. A power type detector 102 provides an input to sleep cycle controller 96 which indicates the type of power currently powering the mobile station 36. The sleep cycle selector 96 may change the variable sleep cycle parameter value based on the type of power detected.

A communications service controller 100 receives inputs from the user when establishing new services, and stores data relating the current service(s). The controller 100 provides input to the sleep mode controller regarding the maximum allowed delay for the purpose of ensuring that the sleep cycle parameter value is not increased so much that it defeats the maximum delay allowed for a particular service requested or subscribed by the mobile station. The communications service controller 100 considers all of the currently subscribed services and determines a maximum delay that can be tolerated to properly provide those services. The value of the maximum delay may limit the value of n, for example, in accordance with the following: n=INT(2 log (max delay/duration of a frame)).

The sleep cycle controller 96 stores the sleep cycle parameters determined for the mobile station currently as well as for various activity levels, (e.g., A2–A4), and provides the current sleep mode parameter n to the transceiving circuitry 92 for transmission to the URAN so that the URAN and core networks can utilize the variable sleep mode parameter value along with the mobile's IMSI to determine the appropriate time and manner to page the mobile station. This information may also be stored, for example, in the MSC/VRL or other central database. Based on the current values for n, S, and W, the sleep cycle controller 96 controls the power provided to the transceiving circuitry 92 and other mobile station circuitry to switch between a low power conservation mode during the sleep cycle to a higher power mode when the mobile station wakes up.

Figure 8:
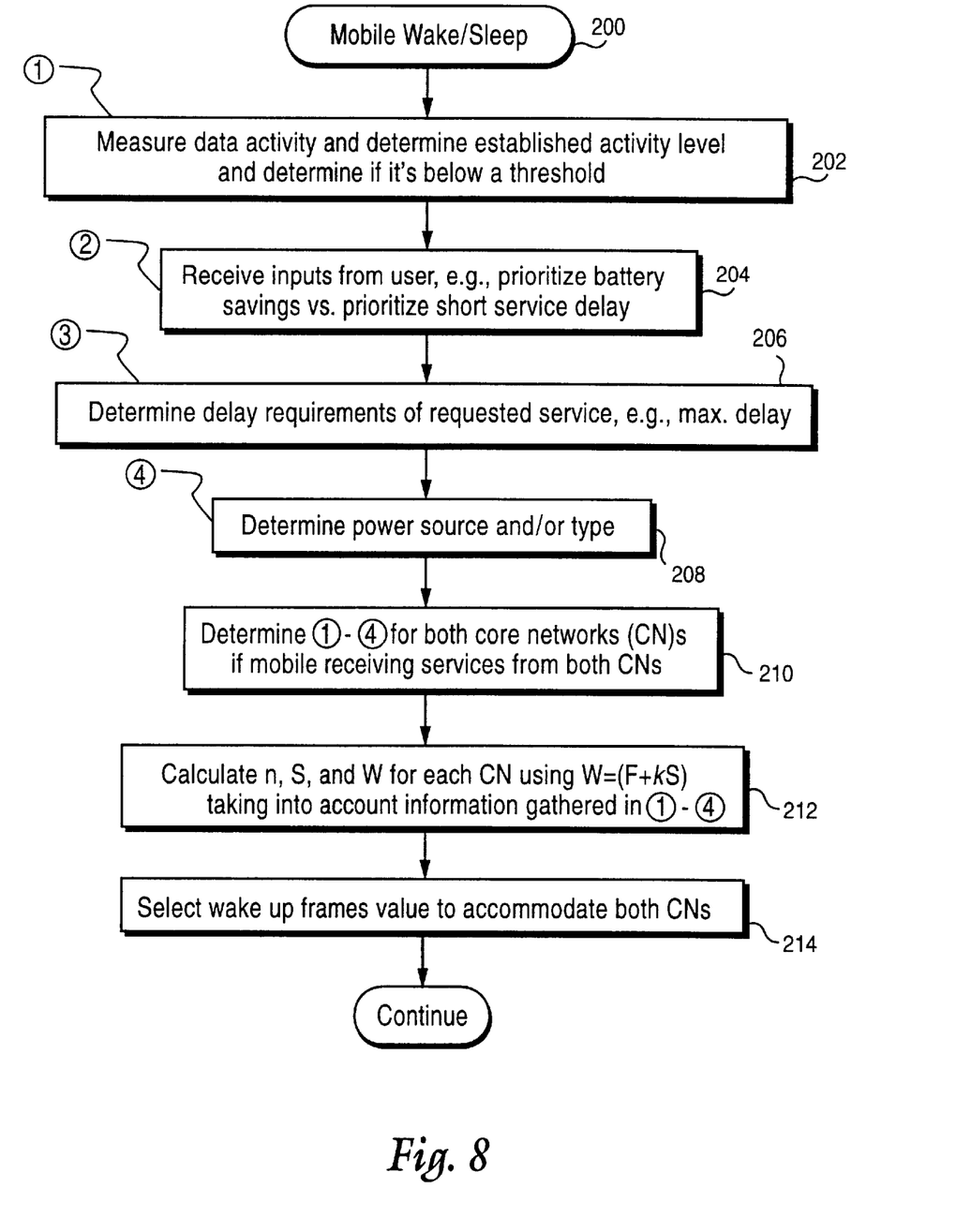
FIG. 8 is a flowchart diagram illustrating a mobile sleep/wake routine in accordance with an example embodiment of the present invention.

A Mobile Sleep/Wake routine (block 200) is described in FIG. 8. Initially, the mobile station may determine the current data activity as well as the established activity level (e.g., A1–A4) and from this information determine whether the current activity is above or below a threshold (block 202 and labeled as step (1)). The mobile station may also receive inputs from a user such as prioritizing battery savings or prioritizing short service delay (block 204 and labeled as step (2)). The mobile may also determine the various maximum delay requirements of one or more services requested or subscribed by the subscriber (block 206 and labeled as step (3)). The mobile station further may determine the power source and/or type (block 208 and labeled as step (4)). The mobile station may also determine similar information from these four steps (1)–(4) for plural core network service nodes if the mobile station subscribes to services from plural core networks (block 210). The mobile station then calculates the variable sleep mode parameter n, the sleep cycle S, and the wake up frames W for each core network using the formulas described above, taking into account the information gathered in one or more the steps (1)–(4) determined for each core network (block 212). The mobile station then determines the wake up frames W that best accommodate the needs of all involved core networks (block 214).

It is also desirable to coordinate the sleep cycle of the mobile station based on various factors for plural core networks. Referring to the example situation in FIG. 9, the mobile station is registered with two core network service nodes 18 and 20 which store corresponding sleep mode parameter values n1 and n2 for this mobile station. The mobile station and URAN 30 also store these sleep mode parameter values n1 and n2. The sleep mode parameter values may be agreed upon by the mobile station and the core network when the mobile last registered with that core network. The parameter values may also be associated with the subscription of the mobile subscriber and stored in the HLR and on a SIM card in the mobile station. When roaming, the mobile may register with or without changing the parameter values. In the latter case, the core network may transfer parameter values from the old MSC/VLR to the new MSC/VLR.

In a preferred embodiment, the sleep cycle and wake up frames for the two core network service nodes are synchronized. Absent such synchronization, the mobile station may ultimately wake up more often than is necessary in order to satisfy the individual wake up time frames W1 and W2 calculated for both of the core networks. Synchronization may be achieved by using the mobile's IMSI and the same algorithm to decide all parameters except the sleep mode cycle and by defining the sleep mode cycle as a power of two.

Figure 9:
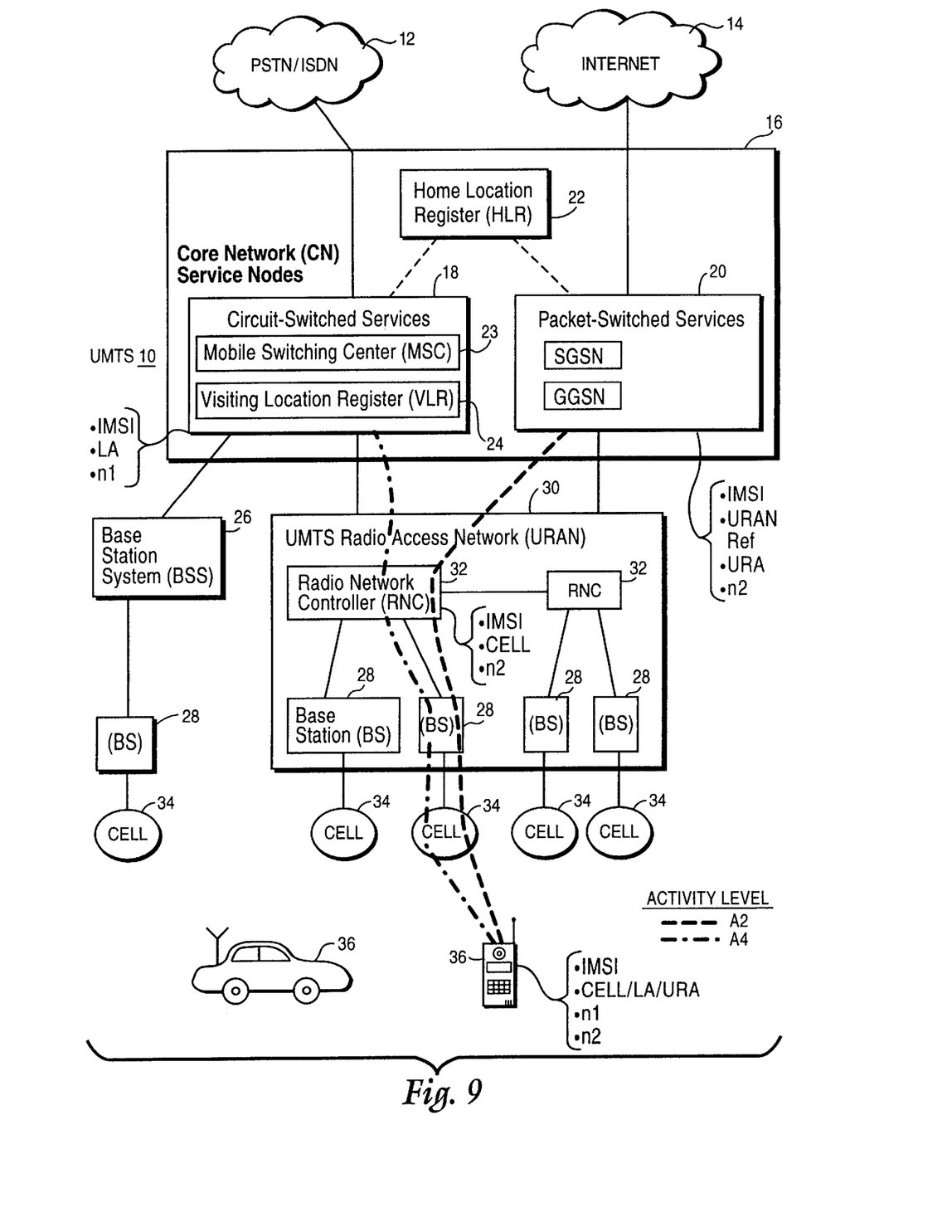
FIG. 9 is a diagram of the UMTS system shown in FIG. 1 showing different mobile station activity levels with respect to two different core network service nodes.

FIG. 9 illustrates an example of the various parameters which are stored in the core network service nodes 18 and 20 including the mobile's IMSI, the mobile station's cell, URA, or location area, and corresponding variable sleep parameter n1 or n2. In this example, the URAN 30 provides an established connection between the mobile station and the packet-switched service node 20. The URAN 30, rather than the service node 20, handles the mobility of the mobile station. To locate the mobile station, the service node 20 does not need to use a paging procedure, and instead employs the already established connection via the URAN 30. The established connection is identified by a "URAN reference." As an example, the URAN reference points at a certain connection between the service node 20 and the RNC 32 that is unique for the mobile, e.g., an SCCP-connection, a TCP-connection, an ATM connection, etc.

The mobile station 36 also stores its IMSI, its current cell, URA or location area, and the variable sleep mode parameters n1 and n2 for the two core network service nodes 18 and 20. The current activity level of the mobile station 36 with respect to the circuit-switched services node 18 happens to be relatively low corresponding to activity level A4. Accordingly, the URAN 30 is unaware of the mobile's connection with node 18, or the variable sleep parameter n1. On the other hand, the activity level of the mobile station 36 with respect to the packet-switched services node 20 is relatively high, and a connection exists corresponding to activity level A2. Because a connection currently exists for the packet-switched services node 20, the URAN 30 knows the mobile's IMSI, its current cell, and the variable sleep parameter n2 corresponding to the packet-switched services node 20.

By defining the sleep mode cycle as a power of two, the wake up frames for each of the two core network service nodes 18 and 20 are provided by:

$$W=(F+k2^{n1}) \text{ modulo } M, \text{ if } n1 \leq n2, \text{ and } W=(F+k2^{n2}) \text{ modulo } M, \text{ if } n2<n1,$$

where k is an integer and M is the largest possible frame number. By defining S and W as a power of two, the wake up instant W is synchronized so that by waking up for the shortest sleep mode cycle required by one of the core network service nodes, the mobile also periodically wakes up on the longer sleep mode cycle required by the other core network service node. For example, because for the short sleep cycle the mobile wakes up at F, F+2, F+4, F+6, F+8, . . . and for the longer sleep cycle the mobile wakes up at F, F+4, F+8, . . . , the two cycles are synchronized.

Thus, the variable sleep mode provided by the present invention allows flexible and selective tradeoff between battery savings and service quality that can be controlled by the mobile station itself, by the user or by the network as necessary. It is also possible to vary the mobile's sleep mode cycle so that it is consistent with different radio resource activity levels which are controlled by the URAN. Still further, the variable sleep cycle allows a mobile station to efficiently listen for independent page messages from different core network nodes while still achieving battery savings even if the respective sleep mode periods for those core networks are different.

While the invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. In a cellular telecommunications system in which a battery-powered mobile station communicates with a network, a method of operating the mobile station comprising:

detecting one or more conditions relating to the mobile station's operation based on the detected one or more conditions, determining a variable wake up parameter value used to establish times when the mobile station automatically leaves a lower power mode and enters a higher power mode; and waking up at the established times, wherein the one or more conditions includes a volume of data per unit time transmitted to or from the mobile station so that for a higher volume, the variable wake up parameter is varied to increase the frequency at which the mobile station wakes up, or for a lower volume, the variable wake up parameter value is varied to decrease the frequency at which the mobile station wakes up.

2. The method in claim 1, further comprising:
providing the mobile station's variable wake up parameter to the network to permit coordinated communications with the mobile station.

3. The method in claim 1, wherein the wake up parameter is calculated in accordance with the following: $S=2^n$, where S is the duration of a variable sleep cycle when the mobile station is in the lower power mode and n is a variable integer.

4. The method in claim 3, wherein the base station and mobile station communicate using a communications channel divided into a repeating sequence of M frames, and where n=0, 1, 2, . . . , M.

5. The method in claim 4, further comprising:
determining wake up frames (W) when the mobile station enters the higher power mode in accordance with the following:
W=(kS) modulo M, where k is an integer.

6. The method in claim 4, further comprising:
determining wake up frames (W) when the mobile station enters the higher power mode in accordance with the following:
W=(F+kS) modulo M, where F is a frame number of the communications channel selected based on an identifier associated with the mobile station.

7. In a cellular telecommunications system in which a battery-powered mobile station communicates with a network, a method of operating the mobile station comprising:
detecting one or more conditions relating to the mobile station's operation;
based on the detected one or more conditions, determining a variable wake up parameter value used to establish times when the mobile station automatically leaves a lower power mode and enters a higher power mode;
waking up at the established times; further comprising:
detecting a change in one or more conditions; and
varying the value of the variable wake up parameter in response to the change.

8. The method in claim 7, wherein the mobile station may operate at plural activity levels and wherein the detected change includes the mobile station operating at a different one of the plural activity levels.

9. The method in claim 8, wherein the plural activity levels correspond to different procedures used to locate the mobile station.

10. The method in claim 8, wherein the detected change includes the mobile initiating a change in the one or more conditions while the mobile station is operating in only one of the activity levels.

11. In a cellular telecommunications system in which a battery-powered mobile station communicates with a network, a method of operating the mobile station comprising:
detecting one or more conditions relating to the mobile station's operation;
based on the detected one or more conditions, determining a variable wake up parameter value used to establish times when the mobile station automatically leaves a lower power mode and enters a higher power mode; and
waking up at the established times,
wherein the one or more conditions includes a service currently requested or subscribed by the mobile station so that for a current service requiring a lower delay, the variable wake up parameter value is varied to increase the frequency at which the mobile station wakes up, or for a current service permitting a higher delay, the variable wake up parameter value is varied to increase the frequency at which the mobile station wakes up.

12. In a cellular telecommunications system in which a battery-powered mobile station communicates with a network, a method of operating the mobile station comprising:
detecting one or more conditions relating to the mobile station's operation;
based on the detected one or more conditions, determining a variable wake up parameter value used to establish times when the mobile station automatically leaves a lower power mode and enters a higher power mode; and
waking up at the established times,
wherein the service includes a maximum delay parameter and the value of the variable wake up parameter is varied to decrease the frequency at which the mobile station wakes up to without exceeding the maximum delay parameter.

13. In a cellular telecommunications system in which a battery-powered mobile station communicates with a network, a method of operating the mobile station comprising:
detecting one or more conditions relating to the mobile station's operation;
based on the detected one or more conditions, determining a variable wake up parameter value used to establish times when the mobile station automatically leaves a lower power mode and enters a higher power mode; and
waking up at the established times,
wherein the one or more conditions includes a delay input from a user of the mobile station so that for a lower delay, the variable wake up parameter value is varied to increase the frequency at which the mobile station wakes up, or for a higher delay, the variable wake up parameter value is varied to decrease the frequency at which the mobile station wakes up.

14. In a cellular telecommunications system in which a battery-powered mobile station communicates with a network, a method of operating the mobile station comprising:
detecting one or more conditions relating to the mobile station's operation;
based on the detected one or more conditions, determining a variable wake up parameter value used to establish times when the mobile station automatically leaves a lower power mode and enters a higher power mode; and
waking up at the established times,
wherein the one or more conditions includes a power savings input from a user of the mobile station so that for greater power savings, the variable wake up parameter value is varied to decrease the frequency at which the mobile station wakes up, or for decreased call setup delay, the variable wake up parameter value is varied to increase the frequency at which the mobile station wakes up.

15. In a cellular telecommunications system in which a battery-powered mobile station communicates with a network, a method of operating the mobile station comprising:

detecting one or more conditions relating to the mobile station's operation;

based on the detected one or more conditions, determining a variable wake up parameter value used to establish times when the mobile station automatically leaves a lower power mode and enters a higher power mode; and waking up at the established times, wherein the one or more conditions includes the type of power source currently powering the mobile station so that for a power source having a shorter life, the variable wake up cycle parameter is varied to increase the cycle, or for a power source having a longer life, the variable wake up cycle parameter is varied to decrease the cycle.

16. In a radio communications system having plural battery-operated mobile stations capable of communicating with one or more core networks using a radio access network, where one of the mobile stations may operate at plural activity levels, a method comprising:

storing a corresponding variable sleep cycle parameter value for the one mobile station for each activity level;

determining a current activity level of the one mobile station;

determining a first time interval when the one mobile station will awaken from a lower power sleep mode of operation to a higher power mode of operation using the variable sleep cycle parameter value corresponding to the detected activity level; and sending a message to the one mobile station on the communications channel during the first time interval.

17. The method in claim 16, wherein when the one mobile station changes to a new activity level, the method further comprises:

determining a second time interval when the one mobile station will awaken from a sleep cycle using the variable sleep cycle parameter value corresponding to the new activity level.

18. The method in claim 16, wherein when the one mobile station is in the current activity level, the method further comprising:

changing the variable sleep cycle parameter value corresponding to the current activity level to a changed value, and determining a second time interval when the one mobile station will awaken from a sleep cycle using the changed variable sleep cycle parameter value.

19. The method in claim 18, wherein the mobile station changes the variable sleep cycle parameter value.

20. The method in claim 16, wherein for a higher current activity, the variable wake up cycle parameter value is varied to increase the frequency at which the mobile station wakes up, or for a lower current activity, the variable wake up cycle parameter value is varied to decrease the frequency at which the mobile station wakes up.

21. The method in claim 16, further comprising:

detecting a decrease in current activity level when the time since a last data transmission exceeds a threshold, and increasing the variable sleep cycle parameter value.

22. The method in claim 21, wherein after the increasing step the method further comprises:

when data is transmitted, resetting the variable sleep cycle parameter value to a default value.

23. The method in claim 16, wherein the plural activity levels correspond to different procedures used to locate the mobile station, the plural activity levels including a first activity level where a user is registered at a base station cell known to the radio access network, a second activity level where a user is registered in a smaller group of base station cells known by the radio access network, and a third larger group of base station cells known by the one or more core networks.

24. The method in claim 16, wherein the determining and sending steps are performed by radio access network.

25. A method for a radio communications system having plural battery-operated mobile stations capable of communicating with a core network using a radio access network, comprising:

determining a service currently requested or subscribed by the mobile station, and wherein for a current service requiring a lower delay, varying the variable wake up cycle parameter value to increase the frequency at which the mobile station wakes up, or for a current service permitting a higher delay, varying the variable wake up cycle parameter value to decrease the frequency at which the mobile station wakes up.

26. The method in claim 25, wherein the service includes a maximum delay parameter and the value of the variable wake up cycle parameter is varied to decrease the frequency at which the mobile station wakes up to without exceeding the maximum delay parameter.

27. The method in claim 25, further comprising:

detecting a delay input from a user of the mobile station, wherein for a lower delay, the variable wake up cycle parameter value is varied to increase the frequency at which the mobile station wakes up, or for a higher delay, the variable wake up cycle parameter value is varied to decrease the frequency at which the mobile station wakes up.

28. The method in claim 25, further comprising:

detecting a power savings input from a user of the mobile station, wherein for greater power savings, the variable wake up cycle parameter value is varied to decrease the frequency at which the mobile station wakes up, or for decreased call setup delay, the variable wake up cycle parameter value is varied to increase the frequency at which the mobile station wakes up.

29. The method in claim 25, further comprising:

detecting a type of power source currently powering the mobile station, wherein for a power source having a shorter life, the variable wake up cycle parameter is varied to increase the cycle, or for a power source having a longer life, the variable wake up cycle parameter is varied to decrease the cycle.

30. The method in claim 25, wherein the wake up cycle parameter is calculated in accordance with the following: $S=2^n$, where S is the duration of a variable sleep cycle when the mobile station is in the lower power mode and n is a variable integer.

31. The method in claim 30, wherein the communications channel includes a series of repeating frames and the first time interval corresponds to one the frames, and where n=0, 1, 2, . . . , M.

32. The method in claim 31, further comprising:
determining wake up frames (W) when the mobile station enters the higher power mode in accordance with the following:
W=(kS) modulo M, where k is an integer.

33. The method in claim 31, further comprising:
determining wake up frames (W) when the mobile station enters the higher power mode in accordance with the following:
W=(F+kS) modulo M, where F is a frame number of the communications channel selected based on an identifier associated with the mobile station.

34. In a radio communications system having plural battery-operated mobile stations capable of communicating with first and second core networks, a method comprising:
storing a first variable sleep parameter value for one of the mobile stations at the first core network and a second variable sleep parameter value for the one mobile station at the second core network;
determining a time interval when the one mobile station will awaken from a lower power sleep mode of operation to a higher power mode of operation taking into account one or both of the first and second variable sleep parameter values; and
sending a message to the one mobile station on a communications channel from one of the core networks during the first time interval.

35. The method in claim 34, wherein storing step includes storing a mobile station identifier for the one mobile station and the corresponding one of the first and second variable sleep parameter values for the one mobile station at both of the core networks.

36. The method in claim 35, further comprising:
storing at the one mobile station the one mobile station identifier and the first and second variable sleep parameter values for the one mobile station.

37. The method in claim 34, wherein the first and second variable sleep parameter values are selected so that a first time interval determined for the first variable sleep parameter value and a second time interval determined for the second variable sleep parameter value are synchronized.

38. The method in claim 37, wherein the first and second time intervals are defined as a power of 2.

39. The method in claim 37, wherein the first and second time intervals are calculated in accordance with the following: $S1=2^{n1}$, where S1 is the first time interval when the one mobile station is in the lower power mode and n1 is an integer corresponding to the first variable sleep parameter, and $S2=2^{n2}$, where S2 is the second time interval when the one mobile station is in the lower power mode and n2 is an integer corresponding to the second variable sleep parameter.

40. The method in claim 39, wherein the communications channel includes a series of repeating M frames, and where n1=0, 1, 2, . . . , M and n2=0, 1, 2, . . . , M.

41. The method in claim 40, further comprising:
determining wake up frames (W) when the mobile station enters the higher power mode in accordance with the following:
$W=(k2^{n1})$ modulo M, where k is an integer, if $n1 \leq n2$, or
$W=(k2^{n2})$ modulo M, where k is an integer, if n2<n1.

42. The method in claim 40, further comprising:
determining wake up frames (W) when the mobile station enters the higher power mode in accordance with the following:
$W=(F+k2^{n1})$ modulo M, where k is an integer, if $n1 \leq n2$, and F is a frame number of the communications channel selected based on an identifier associated with the mobile station, and
$W=(F+k2^{n2})$ if n2<n1.

43. A method of operating a battery-powered mobile radio that communicates over a communications channel in which messages are communicated in a series of M repeating frames, comprising:
determining a variable sleep cycle S when the mobile radio is in a lower power consumption mode, where $S=2^n$ and n is an integer who value is variably determined by the mobile radio, and
determining a wake up time W when the mobile radio leaves the lower power consumption sleep cycle and enters a higher power awake mode, where W=(kS) modulo M and k is an integer.

44. The method in claim 43, wherein W is determined further in accordance with W=(F+kS) modulo M, where F is a frame number of the communications channel selected based on an identifier associated with the mobile station.

45. The method in claim 43, further comprising:
providing the mobile station's variable sleep mode parameter n to the network to permit coordinated communications with the mobile station.

46. The method in claim 43, further comprising:
detecting a change in one or more conditions, and
varying the value of the variable sleep mode parameter n in response to the change.

47. The method in claim 43, further comprising:
determining the value of the variable sleep mode parameter n in accordance with one or more of the following: a volume of data per unit time transmitted to or from the mobile station, an activity level of the mobile station, a procedure used to locate the mobile station, a type of radio channel associated with operation of the mobile station, a service currently requested or subscribed by the mobile station, and a power input associated with the mobile station.

48. A battery-operated mobile station, comprising:
transceiving circuitry for transmitting and receiving data;
a detector for detecting one or more conditions relating to the mobile station's operation; and
a sleep cycle controller for determining a variable wake up cycle parameter used to establish a cycle when the mobile station automatically leaves a lower power mode and enters a higher power mode based on the detected one or more conditions,
wherein the sleep cycle controller is configured to operate the transceiving circuitry in accordance with the determined variable wake up cycle parameter.

49. The battery-operated mobile station in claim 48, wherein the detector is configured to detect a change in one or more conditions and varies the value of the variable wake up cycle parameter in response to the detected change.

50. The battery-operated mobile station in claim 48, wherein the detector is a data activity detector is configured to detect a current level of data being transmitted from or received by the mobile station.

51. The battery-operated mobile station in claim 48, wherein the mobile station may operate at plural activity levels, and wherein the detected change includes the mobile station changing from operation at one of the plural activity levels to operation at another of the plural activity levels.

52. The battery-operated mobile station in claim 51, wherein different procedures used to locate the mobile station for each of the activity levels.

53. The battery-operated mobile station in claim 51, wherein the detected change includes the sleep cycle controller initiates a change in the one or more conditions while the mobile station is operating in only one of the activity levels.

54. The battery-operated mobile station in claim 48, wherein the one or more conditions includes a current activity level of the mobile station so that for a higher current activity, the sleep cycle controller varies the variable wake up cycle parameter value to increase the frequency at which the mobile station wakes up, or for a lower current activity, the sleep cycle controller varies the variable wake up cycle parameter value to decrease the frequency at which the mobile station wakes up.

55. The battery-operated mobile station in claim 48, wherein the one or more conditions includes a service currently requested or subscribed by the mobile station so that for a current service requiring a lower delay, the sleep cycle controller varies the variable wake up cycle parameter value to increase the frequency at which the mobile station wakes up, or for a current service permitting a higher delay, the sleep cycle controller varies the variable wake up cycle parameter value to decrease the frequency at which the mobile station wakes up.

56. The battery-operated mobile station in claim 48, wherein the service includes a maximum delay parameter and the value of the variable wake up cycle parameter is varied to decrease the frequency at which the mobile station wakes up to without exceeding the maximum delay parameter.

57. The battery-operated mobile station in claim 48, wherein the one or more conditions includes a delay input from a user of the mobile station so that for a lower delay, the sleep cycle controller varies the variable wake up cycle parameter value to increase the frequency at which the mobile station wakes up, and for a higher delay, the sleep cycle controller varies the variable wake up cycle parameter value to decrease the frequency at which the mobile station wakes up.

58. The battery-operated mobile station in claim 48, wherein the one or more conditions includes a power savings input from a user of the mobile station so that for greater power savings, the sleep cycle controller varies the variable wake up cycle parameter value to decrease the frequency at which the mobile station wakes up, or for decreased call setup delay, the sleep cycle controller varies the variable wake up cycle parameter value to increase the frequency at which the mobile station wakes up.

59. The battery-operated mobile station in claim 48, wherein the one or more conditions includes the type of power source currently powering the mobile station so that for a power source having a shorter life, the sleep cycle controller varies the variable wake up cycle parameter to increase the cycle, and for a power source having a longer life, the sleep cycle controller varies the variable wake up cycle parameter to decrease the cycle.

60. The battery-operated mobile station in claim 48, wherein the sleep cycle controller calculates wake up cycle parameter in accordance with the following:

$S=2^n$, where S is the duration of a variable sleep cycle when the mobile station is in the lower power mode and n is a variable integer.

61. The battery-operated mobile station in claim 60, wherein the mobile station communicates with a network using a communications channel divided into a repeating sequence of M frames, and where n=0, 1, 2, . . . , M.

62. The battery-operated mobile station in claim 61, wherein n is a power of 2.

63. The battery-operated mobile station in claim 61, the sleep cycle controller determining wake up frames (W) when the mobile station enters the higher power mode in accordance with the following:

W=(kS) modulo M, where k is an integer.

64. The battery-operated mobile station in claim 61, further comprising:

determining wake up frames (W) when the mobile station enters the higher power mode in accordance with the following:

W=(F+kS) modulo M, where F is a frame number of the communications channel selected based on an identifier associated with the mobile station.

65. Apparatus for communicating over a communications channel in which messages are communicated in a series of M repeating frames, comprising:

circuitry for transmitting and receiving data, and a sleep cycle controller configured to determine a variable sleep cycle S when the mobile radio is to operate in a lower power consumption mode, where $S=2^n$ and a variable sleep mode parameter n is an integer whose value is variably determined, and to determine a wake up time W when the mobile radio leaves the lower power consumption sleep cycle and to operate in a higher power awake mode, where W=(kS) modulo M, and k is an integer.

66. The apparatus in claim 65, wherein W is determined further in accordance with W=(F+kS) modulo M, where F is a frame number of the communications channel selected based on an identifier associated with the mobile station.

67. The apparatus in claim 65, further comprising:

a detector configured to detect a change in one or more conditions, wherein the sleep cycle controller is configured to vary the value of the variable sleep mode parameter n in response to the change.

68. The apparatus in claim 65, further comprising:

wherein the sleep cycle controller is configured to determine the value of the variable sleep mode parameter n in accordance with one or more of the following: a volume of data per unit time transmitted to or from the mobile station, an activity level of the mobile station, a procedure used to locate the mobile station, a type of radio channel associated with operation of the mobile station, a service currently requested or subscribed by the mobile station, and a power input associated with the mobile station.

69. In a cellular telecommunications system in which a battery-powered mobile station communicates with a network, a method of operating the mobile station comprising:

detecting one or more conditions relating to the mobile station's operation;

based on the detected condition, determining a variable wake up parameter value used to establish times when the mobile station automatically leaves a lower power mode and enters a higher power mode; and waking up at the established times, wherein the one or more conditions includes one of different procedures used to locate the mobile stations or one of different types of radio channels associated with the operation of the mobile station.

70. In a radio communications system having plural battery-operated mobile stations capable of communicating with one or more core networks using a radio access network and operating at plural activity levels, a method performed by the radio access network comprising:

determining a service currently requested or subscribed by a mobile station;

storing a corresponding variable sleep cycle parameter value for the mobile station for each activity level;

determining a current activity level of the mobile station;

determining a time interval when the mobile station will awaken from a lower power sleep mode of operation to a higher power mode of operation using the variable sleep cycle parameter value corresponding to the detected activity level; and sending a message to the mobile station on the communications channel during the time interval.

* * * * *